(12) United States Patent
Pal et al.

(10) Patent No.: US 12,299,427 B1
(45) Date of Patent: May 13, 2025

(54) GENERATING DEGREE OF DEVELOPMENT OF STRUCTURED PROCESSES USING AUTOMATICALLY CALIBRATED QUERIES

(71) Applicant: ExlService Holdings, Inc., New York, NY (US)

(72) Inventors: Sarika Pal, Bangalore (IN); Anish Goswami, Pune (IN); Vaibhav Mangla, Delhi (IN); Vignesh N, Chennai (IN); Vinod Morya, Pilibhit (IN); Prince Tyagi, Ghaziabad (IN); Divyam Bansal, Palwal (IN); Tirthankar Ghosh, Kolkata (IN); Nagubadi Trinadh, Hyderabad (IN); Pulluri Vamshi Rao, Jayashankar Bhupalpally (IN)

(73) Assignee: ExlService Holdings, Inc., New York, NY (US)

( * ) Notice: Subject to any disclaimer, the term of this patent is extended or adjusted under 35 U.S.C. 154(b) by 0 days.

(21) Appl. No.: 18/923,539

(22) Filed: Oct. 22, 2024

(51) Int. Cl.
| | |
|---|---|
| *G06F 3/048* | (2013.01) |
| *G06F 8/60* | (2018.01) |
| *G06F 9/451* | (2018.01) |
| *G06F 9/455* | (2018.01) |
| *G06F 16/951* | (2019.01) |
| *G06Q 10/00* | (2023.01) |
| *G06Q 99/00* | (2006.01) |

(52) U.S. Cl.
CPC ............ *G06F 8/60* (2013.01); *G06F 9/451* (2018.02)

(58) Field of Classification Search
CPC . G06F 8/60; G06F 40/35; G06F 8/437; G06F 8/38; G06F 16/951; G06F 8/31; G06F 16/2228; G06N 3/08; G06N 3/044; G06N 3/045; G06N 3/105; G06N 3/008; G06N 20/00; G06Q 10/00
See application file for complete search history.

(56) References Cited

U.S. PATENT DOCUMENTS

| | | | | |
|---|---|---|---|---|
| 11,726,803 | B2 * | 8/2023 | Bradfield | G06N 20/00 715/705 |
| 2009/0192836 | A1 * | 7/2009 | Kelly | G06Q 10/06 705/1.1 |

* cited by examiner

*Primary Examiner* — Thuy Dao
(74) *Attorney, Agent, or Firm* — Perkins Coie LLP

(57) ABSTRACT

A process assessment platform for automatic query calibration in sequenced models can be used to generate system actions in management of process deployments. System actions can be generated by using a set of input data from one or more process management systems that define a workflow. The input data can include a set of observed task board information item properties for a particular structured process of the workflow. Using the set of input data, a first AI model can dynamically identify a set of actions from the structured process to be executed. Using the identified set of actions, a second AI model can dynamically classify particular dimensions of the set of task board information items and determine a degree of completion therefor.

20 Claims, 10 Drawing Sheets

| # | Question 202 | Initial 204a | Defined 204b | Managed 204c | Optimized 204d | User Response 206 | Additional Remarks |
|---|---|---|---|---|---|---|---|
| 1:00 | Data Management | | | | | | |
| 1:10 | Data Source and Privacy: Will the LLM be trained on internal data, public datasets, or custom collections? Are there any private or security concerns with the data, and how will they be addressed? | Not identified | Identified but scattered across multiple systems | Identified, collated at single location but not updated on regular basis | Defined data pipelines keeps the data readily available for use | Defined | |
| 1:20 | Quality Control Measures: What quality control measures will be implemented to ensure the cleanliness and accuracy of the training data? (e.g., data cleaning scripts, outlier detection) | No Control Measures has been taken to clean the training data | Data cleaning and accuracy guidelines are defined but it is performed superficially | Data cleaning, standardization, anonymizing is followed as per the guidelines but the process is not standardized | A set and standardized data preprocessing scripts are used to get cleaner data for modelling | Defined | |
| 1:30 | Bias and Fairness: How will bias and fairness be addressed in the training data? Are there techniques or tools to identify and mitigate biases in the dataset? | No biasness or fairness evaluation | Biasness and fairness risks are defined but are rarely monitored | Model biasness and fairness evaluation on ad hoc basis | Regular biasness and fairness evaluations in place with constant monitoring | Defined | |
| 1:40 | Data Preprocessing: What preprocessing steps (e.g., tokenization, cleaning, normalization) will be applied to the data, and are there specific tools or techniques for automation? | No preprocessing | Basic data cleaning like removal of stopwords etc. | Proper data cleaning, preprocessing, outlier detection in place but no standard process followed | Clearly defined and standard process for data preprocessing | Defined | |
| 1:50 | Data Security: How do you ensure data security? | Data is used as is based on assumptions that the data security control measures are already implemented by other team | Data security concerns are addressed. Developers are sensitized about data security. Guidelines for data security are followed but not monitored regularly | Data security guidelines in place and are strictly followed. It is an individual responsibility to ensure data is secure. Regular checks in place to ensure guidelines are followed | Exhaustive data security framework in place with reference to various international laws and compliances. Data is sanitized of any PHI, PII information. Data is secured at all levels and dedicated monitoring team ensures that all security measures are followed | Defined | |
| 1:60 | Versioning and Tracking: How will different versions of the training data be tracked and managed? (e.g., version control system, data versioning tools) | No versioning or tracking | Source data is being stored into storage every time model is being retained | Preprocessed data being stored in storage but cannot be readily used for experimentation | Versioning system is implemented and integrated with the model training process | Defined | |

*FIG. 2*

Process Assessment Platform

| Project Name | Last Assessment Date | Score | Evaluated Status | Action |
|---|---|---|---|---|
| Project A | 08/26/25 | N/A | Not Evaluated | ▫ |
| Project B | 07/25/25 | N/A | Not Evaluated | ▫ |
| Project C | 05/16/25 | 1.6 | Evaluated | ▫ |
| Project D | 03/14/25 | 3.7 | Evaluated | ▫ |
| Project E | 01/23/25 | 2.4 | Evaluated | ▫ |

Rows per page: 5 ▼    1-5 of 13

+ NEW ASSESSMENT

*FIG. 3A*

Process Assessment Platform

Assessment Evaluation | Assessment Validation | Assessment Scores

322 — 1.1 Data Source and Privacy: Will the LLM be trained on internal data, public datasets, or custom collections? Are there any privacy or security concerns with the data, and how will they be addressed?

Maturity Level: Defined — 324

326 — The option that best fits the given list of tasks is "defined." The reason for this choice is that the tasks listed are focused on defining and planning the various aspects of an ML project, from the initial project charter, requirements, and reporting needs to the final steps of user manual creation and updating VAPT/InfoSec testing reports. In addition, the tasks involve defining the ML architecture, workflow, and training pipeline, as well as identifying infrastructure requirements, selecting IaaS providers, and designing database schema and data maps/flows.

Recommendations

328 — To move from the current maturity level (Defined) to the Managed level, the following steps can be taken:

- Follow data cleaning, standardization, and anonymizing guidelines.
- Complete tasks related to data management, version control, and CI/CD deployments.

Correct Me — 330

○ Initial
○ Defined
○ Managed
○ Optimized

[Reason]

SUBMIT

< BACK     1/1     NEXT >

*FIG. 3C*

GENERATING DEGREE OF DEVELOPMENT OF STRUCTURED PROCESSES USING AUTOMATICALLY CALIBRATED QUERIES

TECHNICAL FIELD

The systems, methods, and computer-readable media disclosed herein relate generally to automatic query calibration in sequenced artificial intelligence (AI) models. In some use cases, the sequenced AI models can be implemented in relation to project or process management platforms, such as task boards. For example, the output of sequenced AI models can be used to identify and automatically complete computer-executable tasks in relation to task board items.

BACKGROUND

A project (e.g., workflow) can be thought of as a series of coordinated tasks (e.g., operations, actions) aimed at achieving specific objectives within a defined scope, timeline, and set of resources. Projects can be managed using project management platforms like Agile, Scrum, or Kanban. A particular project can be organized into stages on the project management platforms, such as requirements gathering, design, coding, testing, and deployment in software development, or data collection, preprocessing, and model evaluation in modeling of machine learning operations. Tasks can be thought of as units of work that contribute to the overall workflow objectives. Tasks can be organized into dimensions, such as "data management" in machine learning modeling, and tracked using project management tools to ensure timely and organized completion. Steps in a project typically have inputs, outputs, and criteria for progression to the next stage.

Assessing a degree of development (e.g., maturity level, completion, execution) of a project can present challenges due to the inherent complexity and dynamic nature of modern projects, which often involve numerous interdependent tasks. Additionally, tasks within a project can relate to a variety of different tools and platforms such as code repositories and process management platforms. The degree of development of an overall process can be difficult to determine because a cumulative evaluation of the different tools and platforms used, such as code repositories, project management systems, communication tools, or other specialized software, may be needed. Furthermore, completing a particular task in a set of tasks (e.g., finalizing a code unit, committing a code unit) can have varying levels of impact on downstream tasks in a sequence, and prioritizing such tasks can be difficult due to complex interdependencies.

BRIEF DESCRIPTION OF THE DRAWINGS

FIG. 2 shows an example graphical user interface (GUI) that demonstrates aspects of manually configured assessment evaluations in accordance with some implementations of the present technology.

FIG. 3A shows an example GUI that demonstrates aspects of an assessment management interface of the process assessment platform in accordance with some implementations of the present technology.

FIG. 3C shows an example GUI that demonstrates aspects of an assessment validation interface of the process assessment platform in accordance with some implementations of the present technology.

Figure 1:
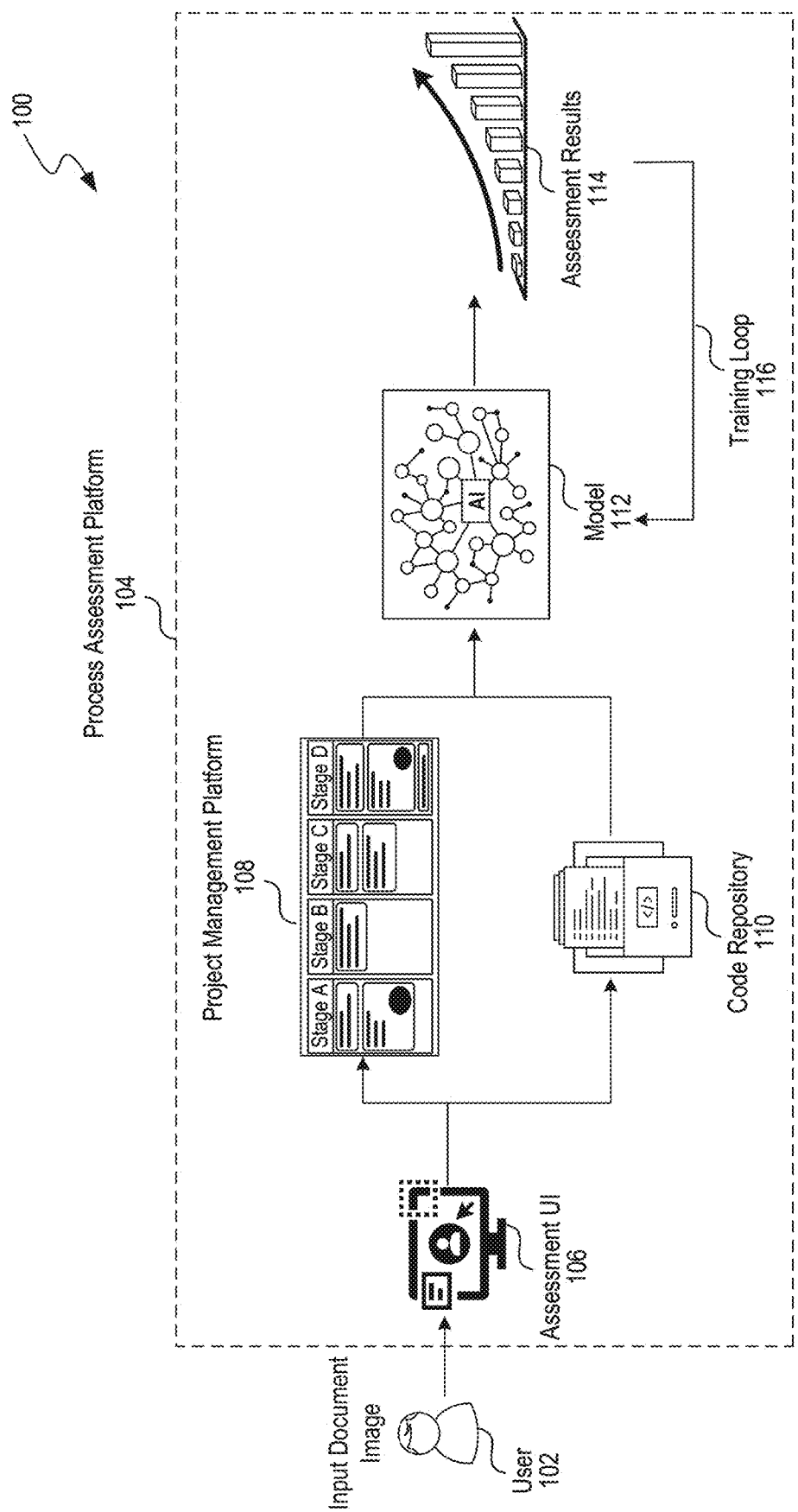
FIG. 1 shows an example computing environment that includes a process assessment platform in accordance with some implementations of the present technology.

The drawings have not necessarily been drawn to scale. For example, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Conventional project management systems can rely on human operators to monitor and evaluate task progress, identify bottlenecks, and reallocate resources, which can be resource-intensive and prone to inaccuracies. Project managers and team members typically rely on information segmented across different tools and platforms to gather data, which they may manually integrate and analyze to assess the progress of various tasks. The fragmented approach makes it particularly challenging to score a dimension of the workflow accurately. For instance, evaluating the completion status of a task may include cross-referencing data from a project management tool, a code repository, and/or a testing platform. The tools can use different metrics and update frequencies, leading to inconsistencies and outdated information. Further, projects can have different sets of best practices and standards, such as software development lifecycle (SDLC), machine learning (ML) modeling, or DEVOPS, and manually aligning the best practices to particular dimensions of a particular project is often cumbersome and error-prone. For example, individuals may overlook or forget minute details of the processes followed when calibrating the project to the best practices. Moreover, while Scrum or Kanban boards can contain information about the SDLC, ML modeling, and DEVOPS processes, the information is rarely utilized effectively during the calibration process. Manually extracting and analyzing the information to calibrate the processes is often neglected due to the sheer volume of data and the complexity involved.

In addition to being procedurally inefficient, the conventional approach also results in another technical problem: inefficient use of computational resources. Human operators typically frequently interact with various computing systems to input data, update statuses, and generate reports, which can lead to high CPU and memory usage due to the constant need for data processing and storage. The manual nature of assessing a degree of development for a particular dimension (e.g., data management) of a project means that large volumes of data are often processed multiple times, as different operators may independently search for the same overlapping information to generate fragmented reports (e.g., querying the same dataset to generate different reports on different metrics/dimensions). For example, when assessing a dimension of a project such as data management, one user queries the system to retrieve data on the number of records ingested, the time taken for each ingestion task, and any errors encountered during the process, whereas another user queries the same data sources to extract information on data quality metrics. The untargeted data processing not only slows down the system but also increases the load on servers and databases, potentially leading to performance bottlenecks and slower response times.

Disclosed herein are systems, methods, and computer-readable media for automatic query calibration in sequenced models used to generate system actions in process deployment management (hereinafter the "process assessment platform"). In an example implementation, a process assessment platform obtains a set of input data from one or more process management systems defining a workflow (i.e., project, process). The set of input data includes observed properties of task board information items (e.g., task status, assigned personnel, deadlines) within the workflow. The process assessment platform can dynamically identify a set of actions (i.e., tasks) from the workflow to be executed. Using the identified set of actions, the process assessment platform can dynamically align and classify particular dimensions of the task board information items (e.g., data preprocessing, model development, model evaluation) to correlate these items to a degree of completion. In some implementations, the platform can cause automatic execution of computer executables that relate to the task board information items. For example, the platform can cause code units to be automatically saved, versioned up, distributed, committed, and so forth. In another example, the platform can cause alerts to be automatically generated and delivered to the appropriate computing systems via text messages, pop-up messages, email messages, and so forth.

To perform the aforementioned operations, the techniques described herein include generating automatically calibrated queries, also sometimes referred to prompts or instructions sets. Conventionally, in AI/ML operations, using one particular model to generate a particular output can result in computing inefficiencies and decreased model accuracy. These technical problems can result from a large size of the model (e.g., a high number of layers and/or nodes). The techniques described herein solve this technical problem by implementing sequences of models. In order to increase input accuracy of downstream models in the sequences, the techniques described herein include automatic query calibration. Example queries can include observed properties of the task board information items for the particular dimension (e.g., current progress, task dependencies), expected properties of the task board information items for the particular dimension (e.g., target milestones, required deliverables), and/or pre-loaded query context defining one or more task board information items (e.g., historical data, project guidelines, dimension definitions). Using the queries, the process assessment platform can map the particular dimension of the workflow to a degree of completion (i.e., degree of execution, degree of development) that indicates how many actions from the set of actions have been executed for the particular dimension.

The process assessment platform enables various additional technical advantages. For example, the process assessment platform can dynamically identify and classify tasks within a project, thereby improving a particular computing device's ability to handle large volumes of data and complex projects. Automatically calibrating prompts and using sequences of models can result in reduced response times for process assessments and improve the efficiency of computational resource use. Sequenced models can use parallel processing techniques to handle queries in a substantially contemporaneous manner, speeding up operations of the platform. The process assessment platform's ability to dynamically generate and execute queries increases the platform's computational efficiency by allowing for targeted data retrieval and processing, thereby reducing the overall system load. Further, the process assessment platform reduces the need for repeated data retrieval and redundant processing found in conventional approaches. The targeted and efficient use of computational resources not only speeds up response times but also lowers processor and memory usage, leading to a more scalable system. For example, to avoid inefficiencies that result from having multiple users independently query the same data sources and cause redundant processing, the process assessment platform can generate a query that addresses multiple assessment aspects (e.g., dimensions) of the project. Moreover, the use of automated prompt calibration allows the platform to continuously learn and adapt to changing conditions. As the process assessment platform processes more data and encounters various scenarios, the process assessment platform can refine the prompts and models (e.g., through incremental training) and improve the accuracy and efficiency of the process assessment platform's assessments.

Using sequenced models, the platform can interpret data from multiple sources, such as project management tools and code repositories, and identify necessary actions and classify them into degrees of completion automatically. Furthermore, the process assessment platform enables a technical advantage of executing various triggers based on real-time project states. For instance, the process assessment platform can trigger automated workflows when certain conditions are met, such as the completion of a task or the detection of a potential bottleneck. The triggers are configured to respond to specific events (e.g., task completion, deadline breaches) and can initiate and/or automatically execute actions such as code management, resource reallocation, task reassignment, notification actions, or escalation.

Example Embodiments of a Process Assessment Platform

FIG. 1 shows an example computing environment 100 that includes a process assessment platform in accordance with some implementations of the present technology. Computing environment 100 includes user 102, process assessment platform 104, assessment user interface 106, project management platform 108, code repository 110, model 112, assessment results 114, and training loop 116. Process assessment platform 104 is implemented using components of the example computer system 600 illustrated and described in more detail with reference to FIG. 6. Likewise, implementations of example environment 100 can include different and/or additional components or can be connected in different ways.

The user 102 represents the individual or entity interacting with the system, providing input data such as observed properties of task board information items and engaging with the assessment user interface to initiate and manage the assessment process. For example, a user 102 such as a project manager can upload a document and/or image indicating (e.g., via a URL) a project from a project management platform 108, which includes task descriptions, deadlines, and/or assignees. Examples of project management platforms 108 include JIRA, a tool for issue and project tracking, and TRELLO, a task management tool using boards, lists, and cards.

A project is a series of coordinated tasks to achieve specific objectives within a defined scope, timeline, and set of resources. The tasks within the project can be aligned with the various components-such as requirements gathering, design, development, testing, and deployment-within the project management platform 108. Projects are typically managed using methodologies like Agile, Scrum, or Kanban, which provide management tools for planning, executing, and monitoring tasks. For example, in software development, a project can encompass stages such as requirements gathering, design, coding, testing, and deployment. For ML modeling, the project can include data collection, data preprocessing, feature engineering, model selection, training, validation, and evaluation. In deployment processes, the project can include setting up infrastructure, configuring deployment pipelines, conducting deployment tests, and monitoring the deployed applications.

A task is a discrete unit of work that contributes to the overall project objectives. In software development, tasks can include activities such as writing code, conducting code reviews, performing unit tests, and integrating new features. For ML modeling, tasks can include data preprocessing, feature engineering, model training, hyperparameter tuning, and model evaluation. In deployment processes, tasks can encompass setting up infrastructure, configuring deployment pipelines, conducting deployment tests, and monitoring deployed applications. Each task typically has defined inputs (e.g., requirements, data sets, configurations), outputs (e.g., code commits, trained models, deployed applications), and criteria for completion (e.g., passing tests, achieving performance metrics, successful deployment). Tasks can be tracked and managed using project management platform 108 such as Agile, Scrum, or Kanban boards, which provide a visual representation of the project and help ensure that all necessary steps are completed in a timely and organized manner.

Tasks within a project can be organized into dimensions. For example, in ML modeling, tasks can be grouped into the dimension of "data management," which include activities related to handling and preparing data for model training. The dimension can include tasks such as data collection, data cleaning, data transformation, and data storage. Each of the tasks addresses a specific aspect of data management, ensuring that the data used for modeling is accurate, consistent, and ready for analysis.

Observed properties of the task board information items are the attributes and data associated with each task on a Kanban board or similar project management platform 108. Task board information items provide context and information to help team members understand, manage, and track the progress of tasks. Task board information items can include the task description, which outlines what needs to be done and any specific requirements or objectives; the assignee, who is the team member responsible for completing the task; the due date, which is the deadline by which the task should be completed; the priority, indicating the task's importance relative to other tasks; the status, showing the current stage of the task within the workflow, such as "To Do," "In Progress," or "Done"; and/or attachments, which are relevant files or documents associated with the task.

The process assessment platform 104 uses one or more AI models (e.g., model 112) to dynamically identify tasks from projects, classify task board information items, and generate assessment results. Examples of the process assessment platform 104 and methods of dynamically identifying tasks from projects and classifying task board information items are discussed with further reference to FIGS. 3A-4. The assessment user interface 106 of the process assessment platform 104 enables the user to interact with the system. The assessment user interface 106 allows the user to input documents, view assessment results, and/or manage the assessment process. The assessment user interface 106 can provide a graphical layout indicating the degrees of completion for each dimension of the task board information items, for easy interpretation and decision-making. For example, the assessment user interface 106 can display a progress bar for the evaluation status of the project, showing that, for example, "Project A" is 50% evaluated, "Project B" is 80% evaluated, and so on. The project management platform 108 integrates with the process assessment platform 104 to provide relevant data (e.g., the task descriptions, deadlines, and/or assignees indicated by the user 102).

In some embodiments, the user 102 indicates the code repository 110 to the assessment user interface 106. The code repository 110 is used to retrieve code changes, commits, and other indicators of task completion, which can be used for evaluating the degree of completion of one or more dimensions of the project. For example, the process assessment platform 104 can check the code repository 110 to see if a specific feature branch has been merged into the main branch, indicating that the corresponding task is complete. The model 112 represents the ML or AI model used to assess the project indicated by the user 102. The model 112 can be trained on historical project data to classify each dimension of the task board information items in the project into a corresponding degree of completion. The model 112 can dynamically generate queries and map the project dimensions to the corresponding degrees of completion based on observed and expected task board information item properties. For instance, the model 112 can compare the number of completed code reviews against the expected number to determine the completion percentage of a code review task.

The assessment results 114 are the outcomes of the assessment process of process assessment platform 104, providing insights into the current stage of development of the structured processes and highlighting areas for improvement. The assessment results 114 can be displayed in the assessment user interface 106, showing the degrees of completion for each dimension and/or any alerts indicating delays or issues. For example, the results can show that the "Data Management" dimension of a project is only 40% complete, triggering an alert for the project manager to allocate more resources to data management. The training loop 116 allows the process assessment platform 104 to iteratively train the model 112. The training loop 116 allows the model 112 to continuously learns from new data and adapts to changes in the project, maintaining the effectiveness of the process assessment platform 104. For instance, if the model 112 initially misclassifies a dimension's completion status, the training loop 116 allows the model 112 to adjust the relevant parameters to improve future classifications using information learned from the misclassification. Examples of the training loop 116 are discussed with further reference to FIG. 4.

FIG. 2 shows an example GUI 200 that demonstrates aspects of manually configured assessment evaluations in accordance with some implementations of the present technology. GUI 200 includes question 202, maturity levels 204, and user response 206. GUI 200 is implemented using components of the example computer system 600 illustrated and described in more detail with reference to FIG. 6. Likewise, implementations of GUI 200 can include different and/or additional components or can be connected in different ways.

GUI 200 facilitates the manual assessment of one or more dimensions of a project. For example, in FIG. 2, GUI 200 is evaluating a dimension (i.e., data management processes) within a project. Questions 202 represents specific queries related to different dimensions of the project to be evaluated and probe the current state of various processes and practices within the project. For instance, a question 202 can relate to "Data Management," that includes questions related to various tasks asking whether a Large Language Model used in the project will be trained on internal data, public datasets, or custom collections, and if there are any privacy or security concerns with the data, and how they will be addressed.

The maturity levels 204 are predefined categories that represent the maturity of the dimension in place for the specific question. The maturity levels 204 can include, for example, a level where the dimension is not identified or is in a very rudimentary state (e.g., initial 204a); a level where the dimension is identified and defined but may not be fully implemented or regularly updated (e.g., defined 204b); a level where the dimension is implemented, managed, and regularly updated (e.g., managed 204c); and a level where the dimension is fully optimized, standardized, and continuously improved (e.g., optimized 204d). For example, if the data source and privacy concerns are identified and collated at a single location but not updated regularly, the user can select the "Defined" maturity level.

The GUI 200 presents a series of questions (like question 202) to the user, each targeting a specific aspect of data management or other relevant dimensions in the workflow. The user response 206 is input by the user (e.g., user 102 in FIG. 1) in response to the question to evaluate a particular dimension. For each question, the user evaluates their current code repository and/or project management platform(s) and selects the appropriate maturity level (e.g., a first maturity level 204a, second maturity level 204b, third maturity level 204c, or fourth maturity level 204d) that best describes the state of the dimension as applied to the project. For instance, if the user believes that the data security process is well-defined but not yet fully managed, the user can select the "Defined" maturity level. The user response 206 can be recorded and used to assess the overall maturity of the project. The user responses 206 are then used to calculate an overall maturity score for the project (or on a dimension-level basis) based on predefined weights. Each maturity level corresponds to a numerical value that contributes to the overall score.

FIG. 3A shows an example GUI 300 that demonstrates aspects of an assessment management interface of the process assessment platform 104 of FIG. 1 in accordance with some implementations of the present technology. In FIG. 3A, GUI 300 includes projects 302, project details 304, and new assessment indicator 306. GUI 300 is implemented using components of the example computer system 600 illustrated and described in more detail with reference to FIG. 6. Likewise, implementations of GUI 300 can include different and/or additional components or can be connected in different ways.

GUI 300 presents a list of projects (e.g., projects 302) to the user, each with a summary of the projects' assessment status. GUI 300 is a visual interface that allows users to interact with electronic devices using graphical elements like windows, icons, and buttons, rather than text-based commands. The projects 302 are displayed on GUI 300 to provide an overview of the project's 302 status and scores. Each project entry can include project details 304 such as the project name, the last assessment date, the score, the evaluated status, and/or an action column. For example, in FIG. 3A, "Project A" is listed as last assessed on Aug. 26, 2025 and not yet evaluated (e.g., no degree of completion has been assigned to Project A), while "Project C" shows a score (i.e., degree of completion) of 1.6 and is marked as evaluated. GUI 300 can be displayed in a tabular format with pagination controls, allows users to easily navigate through multiple projects 302 and quickly identify the state of each project.

In some implementations, selecting (e.g., via a cursor) a project provides more in-depth information about the selected project from the list of projects 302. For example, information can include specific assessment metric values, historical data, and other relevant details that help in understanding the project's status and progress. For instance, selecting "Project C" from the projects 302 list can display information about Project C's assessment history, including the criteria used for evaluation, the specific scores for different aspects of the project, and/or any notes or comments from previous assessments.

If a new assessment is needed, the user can initiate the new assessment using the new assessment indicator 306. The new assessment indicator 306 can be a button or link that allows the user to initiate a new assessment for a project. Clicking the new assessment indicator 306 can, for example, open a form or a new page where the user can input data and parameters for the new assessment. For example, a user clicks the new assessment indicator 306 to start a new assessment of "Project B," to reflect the project's progress, such as any new operations/actions performed/executed. GUI 300 allows users to manage multiple projects efficiently, track their progress over time, and make informed decisions based on detailed and up-to-date assessment data.

To initiate a new assessment, the user can interact with the new assessment indicator 306, which triggers GUI 200 to prompt the user for data entry related to entering project-specific information, selecting relevant parameters, and specifying the scope of the assessment. Once the project-specific information is entered, the user submits the form, and GUI 200 guides the user through a process of validation checks. The validation check can include authenticating the user through the use of secret keys to ensure a secure connection. For example, if the process assessment platform 104 integrates with third-party tools like Jira or Asana, the user can be required to provide a Jira secret key or an Asana secret key. Initially, the process assessment platform 104 generates and stores a unique secret key for the user. When the user attempts to submit the form, the process assessment platform 104 prompts for the secret key, which the user can provide. The key is used to create a secure, encrypted connection between the user's device and the server, which can use industry-standard encryption protocols such as Transport Layer Security (TLS)/Secure Sockets Layer (SSL). The process assessment platform 104 verifies the secret key against the stored records to authenticate the user's identity, ensuring that only authorized users can access and submit sensitive project data. For instance, a user integrating with Jira can enter their Jira secret key, which the process assessment platform 104 can validate to confirm their identity and permissions. Similarly, for Asana, the user can provide their Asana secret key. Once authenticated, the secure connection remains active for the duration of the session, protecting all data transmitted between the user and the server from interception and tampering.

Figure 3B:
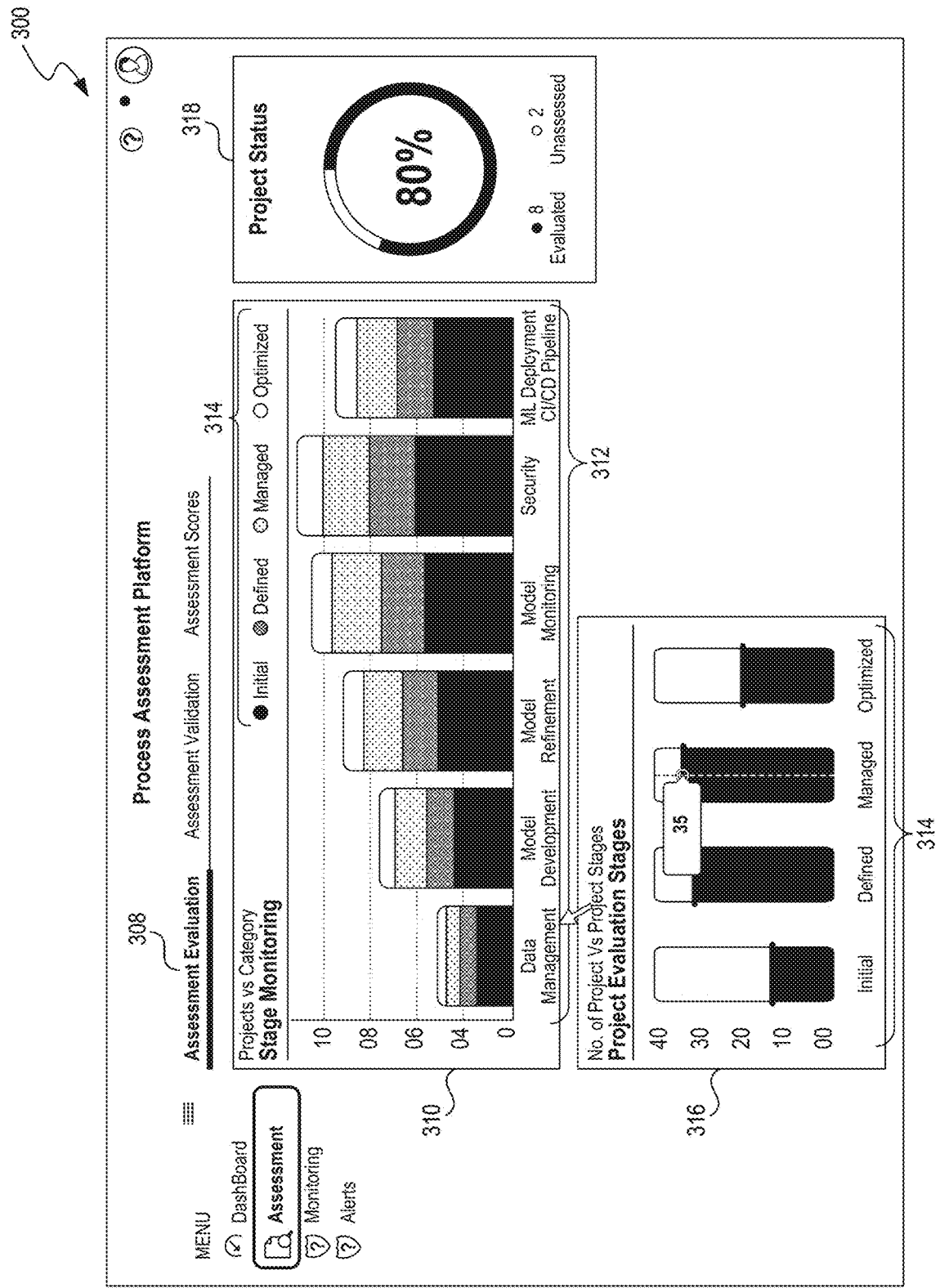
FIG. 3B shows an example GUI that demonstrates aspects of an assessment evaluation interface of the process assessment platform in accordance with some implementations of the present technology.

FIG. 3B shows the example GUI 300 that demonstrates aspects of an assessment evaluation interface of the process assessment platform 104 of FIG. 1 in accordance with some implementations of the present technology. In FIG. 3B, GUI 300 depicts validation 320, which includes a categorized evaluation 310 of dimensions 312, project stage evaluation 316 of maturity levels 314, and project status 318. Maturity levels 314 is the same as or similar to maturity levels 204 in FIG. 2.

The categorized evaluation 310 of dimensions 312 helps in identifying specific areas that need improvement and areas that are well-managed. The categorized evaluation 310 indicates the values of the evaluation of various dimensions or aspects of the projects being assessed. Each dimension 312 is evaluated to determine the degree of completion (such as a score or maturity level 314) of the processes involved. The degree of completion of a task, which can be represented by a maturity level or a score, is a measure of how thoroughly and effectively a task has been executed according to predefined criteria and best practices. The dimensions 312 can include various aspects of processes and projects such as, in an example of an AI-related project, Data Management, Model Development, Model Refinement, Model Monitoring, Security, ML Deployment, and Continuous Integration/Continuous Deployment (CI/CD) Pipeline. For example, the Data Management dimension can be evaluated based on how well data is collected, cleaned, and stored, while the Model Development dimension can be assessed based on the robustness and accuracy of the models being developed.

A score is a quantitative measure used to evaluate and compare the performance, quality, or effectiveness of a particular project or dimension of a project. The score is typically derived from a set of criteria or metrics and is expressed as a numerical value. A maturity level, on the other hand, is a qualitative measure that describes the degree of development, sophistication, and adherence to best practices within a particular project or dimension of a project. Maturity levels can be defined in stages, such as "Initial," "Managed," "Defined," and "Optimized," each representing a higher degree of capability and effectiveness. Maturity levels provide a framework for assessing the current state of a process or organization and identifying steps needed to advance to the next level. Maturity levels can be determined based on the score, where each maturity level is defined within a predefined score threshold (e.g., "Defined" includes scores between 2 and 3).

The project stage evaluation 316 can evaluate the projects based on their maturity levels 314. The maturity levels indicate how advanced and well-defined the processes are within each project. For instance, a project in an earlier stage or lower maturity level can have undocumented and inconsistent processes, while a project in a later stage or higher maturity level can have well-documented, standardized, and continuously improved processes. In FIG. 3B, for example, the project stage evaluation 316 shows that 35 projects, have reached the "Managed" stage, indicating that the 35 projects have well-documented and standardized processes. In some implementations, the project stage evaluation 316 is across multiple dimensions. In some implementations, the project stage evaluation 316 is of the overall maturity level/degree of completion for the project. Examples of the overall maturity level are discussed with reference to overall score 336 in FIG. 3D.

The project status 318 offers an overview of the progress of the assessment process, ensuring that all tasks in the project as related to the evaluated dimensions of the project are evaluated and monitored effectively. The project status 318 component provides an overview of the status of various tasks, indicating whether the tasks have been evaluated or remain unassessed. The project status 318 helps users quickly identify which tasks in the project have undergone the assessment process and which ones still need to be evaluated. For example, the project status 318 can show that a particular operation remains unassessed and needs to be evaluated to provide an up-to-date maturity level of the process.

FIG. 3C shows the example GUI 300 that demonstrates aspects of an assessment validation interface of the process assessment platform 104 of FIG. 1 in accordance with some implementations of the present technology. In FIG. 3C, GUI 300 depicts validation 320, which includes question 322, model output maturity level 324, model output explanation 326, model output recommendations 328, and feedback interface 330.

The questions 322 are answered by one or more models (e.g., model 112 in FIG. 1) to assess various aspects of the process, and the responses of the one or more models can be validated by a user. The question 322 are the specific questions posed during the assessment to evaluate various aspects of the process. Based on the model's responses, the process assessment platform 104 determines the maturity level 324 of the project and provides an explanation 326 to clarify why the project was assigned a particular maturity level. The model output explanation 326 can outline the reasons behind the maturity level 324, indicating the strengths and weaknesses of the project's processes. For example, the explanation can indicate that the process was assigned a "Defined" maturity level because the process's data management processes are documented but not regularly updated. This explanation helps users understand the rationale behind the assessment results and identify specific areas of improvement. Recommendations 328 can be generated to guide the project towards higher maturity levels, and users can interact with the feedback interface 330 to provide insights and suggestions, which can be used to improve the one or more models. In some implementations, the process assessment platform 104 automatically executes actions within recommendations 328. Methods of automatically executing actions are discussed with reference to FIG. 4.

Figure 3D:
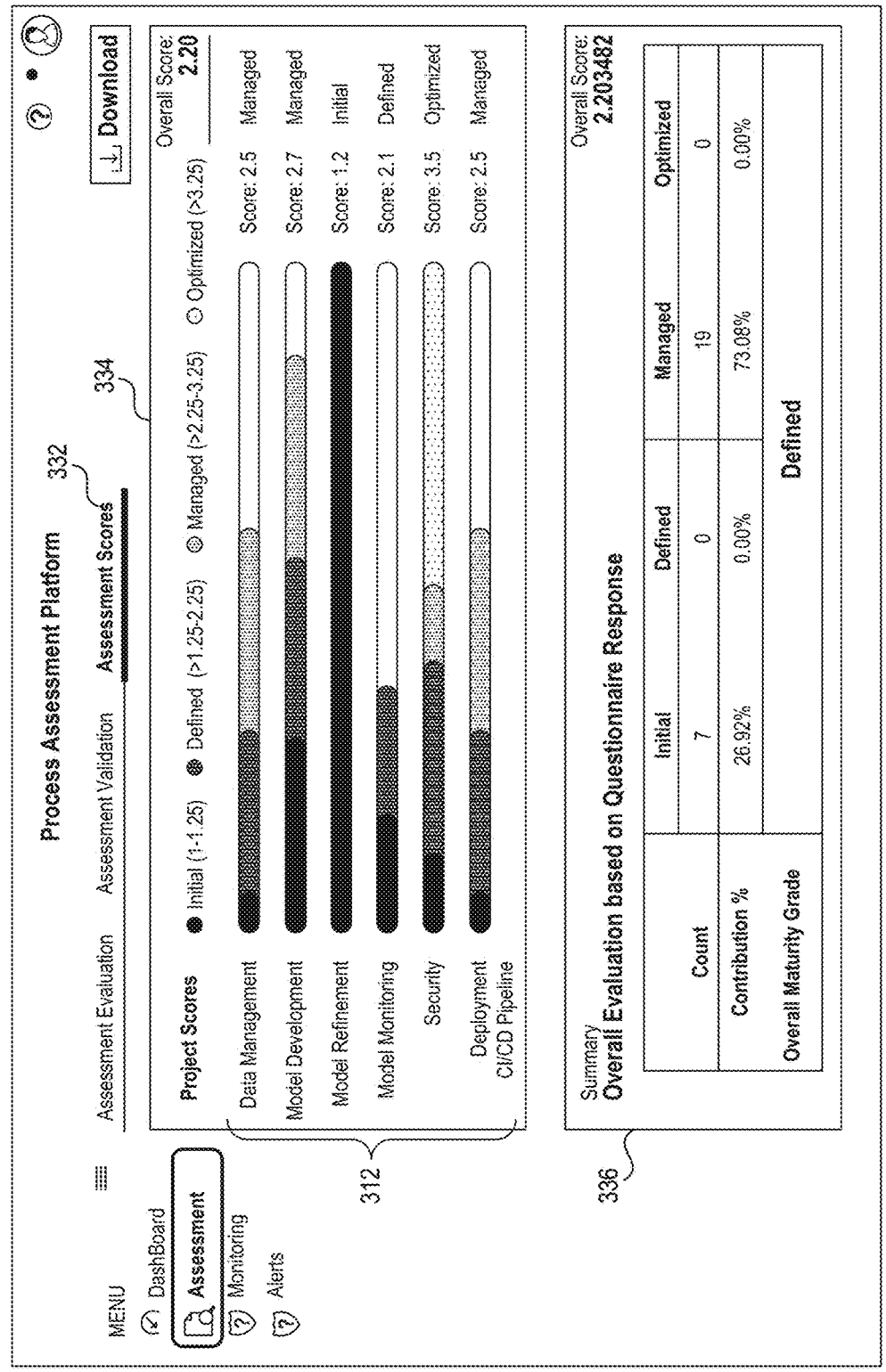
FIG. 3D shows an example GUI that demonstrates aspects of an assessment score interface of the process assessment platform in accordance with some implementations of the present technology.

FIG. 3D shows the example GUI 300 that demonstrates aspects of an assessment score interface of the process assessment platform 104 in accordance with some implementations of the present technology. In FIG. 3D, GUI 300 depicts scores 332, which includes project scores 334 of dimensions 312 and overall score 336.

The overall score 336 component provides a composite score that aggregates the project scores 334 from all dimensions. The overall score 336 score offers a holistic view of the process's maturity level. For instance, a process with an overall score of 2.5 can be categorized as the Managed maturity level, meaning the process has established processes and guidelines but still has room for improvement. Conversely, a process with a higher overall score of 3.5 can be categorized in a higher maturity level (such as "Optimized"), if, for example, the process has well-defined, efficient, and continuously improving processes. The overall score 336 provides a summary of the process's maturity level and helping users understand the process's current state and also identify areas of the project that have room for improvement.

Example Methods of Operation of the Process Assessment Platform

Figure 4:
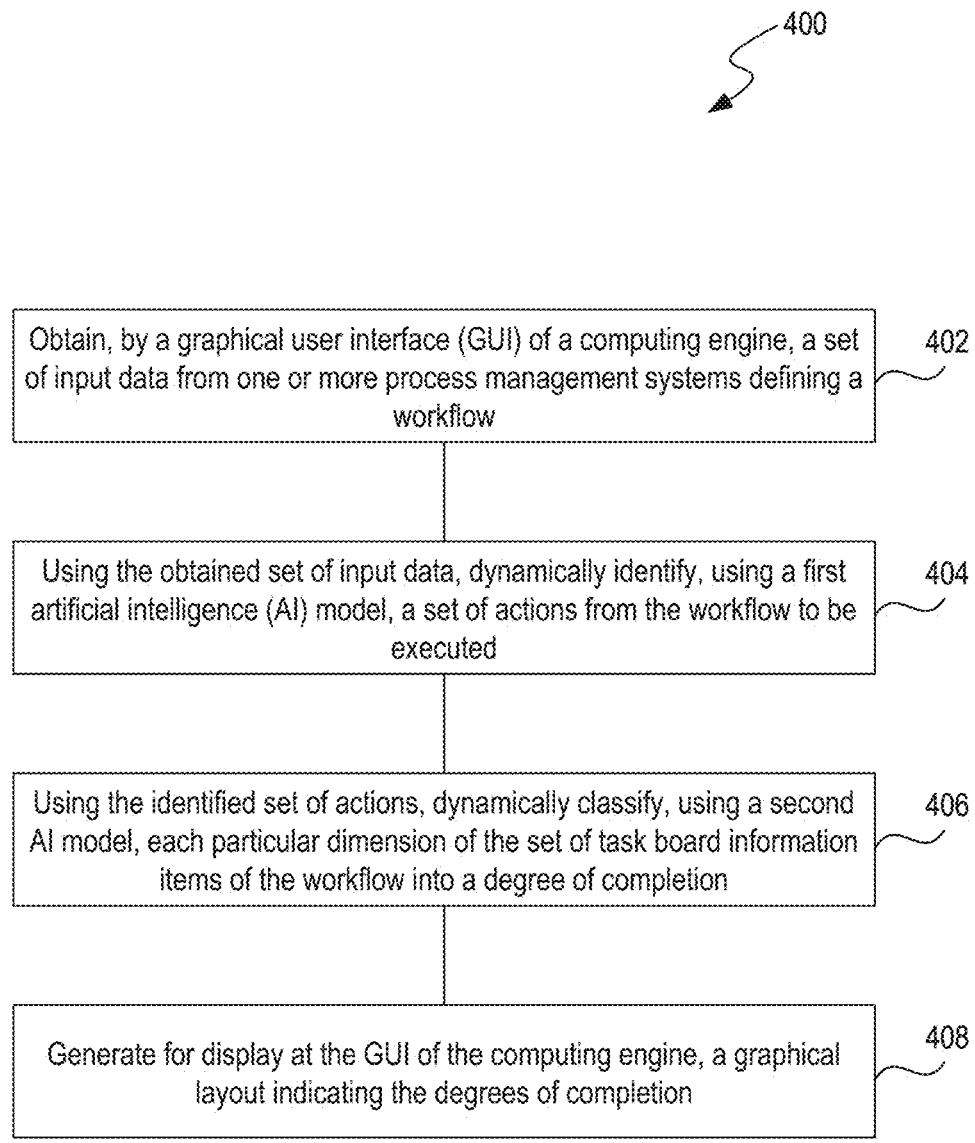
FIG. 4 is a flowchart depicting an example method of operation of the process assessment platform of FIG. 1, in accordance with some implementations of the present technology.

FIG. 4 is a flowchart depicting an example method 400 of operation of the process assessment platform 104 of FIG. 1, in accordance with some implementations of the present technology. In some implementations, the method 400 is performed by components of the example computer system 600 illustrated and described in more detail with reference to FIG. 6. Likewise, implementations can include different and/or additional operations or can perform the operations in different orders.

In operation 402, the process assessment platform 104 obtains, by a GUI of a computing engine (e.g., assessment user interface 106 in FIG. 1, GUI 300 in FIGS. 3A-3D), a set of input data from one or more process management systems (e.g., project management platform 108 in FIG. 1), which can be tools or platforms used to plan, track, and manage workflows and projects. The computing engine can be a software application or a hardware device.

The set of input data can include a set of observed task board information item properties of a set of task board information items of the workflow (e.g., projects 302). Task board information items are elements on a task board that represent individual tasks or activities within a workflow. Examples of task boards include Kanban boards, where cards representing tasks move through columns like "To Do," "In Progress," and "Done." The observed task board information item properties provide information about each task board item (e.g., from a code repository) and can be categorized into task attributes, project attributes, and code attributes. The observed task board information item properties can include task attributes, project attributes, and/or code attributes. Task attributes describe specific details about individual tasks, such as task descriptions and/or definitions. Project attributes provide information about the overall project, including project milestones, timelines, and resource allocations. Code attributes are specific to software development projects and describe aspects of the codebase, such as code quality metrics, repository status, and version control information.

In some implementations, the set of input data is obtained from scraping the process management system and/or code repositories. Code repositories, such as GITHUB, GITLAB, and BITBUCKET, are storage locations where code is kept, managed, and version-controlled, allowing multiple developers to collaborate on codebases. For example, the process assessment platform 104 can use application programming interfaces (APIs) supported by the process management system that allow programmatic access to the input data. For example, a scraper can be written using a programming language like PYTHON, to interact with the API of the process management system and extract task data such as descriptions, deadlines, and assignees. Similarly, scraping code repositories can include a scraper written using a programming language to extract commit messages, code quality metrics, and repository status.

In operation 404, using the obtained set of input data, the process assessment platform 104 dynamically identifies, using a first AI model, a set of actions from the workflow to be executed. The first AI model can be a neural network, decision tree, or other ML algorithm trained on historical project data. The first AI model can recognize patterns and correlations within the obtained set of input data, enabling the first AI model to identify the actions within the project. The first AI model can use techniques such as natural language processing (NLP) to interpret textual data within the obtained set of input data and feature extraction to identify variables influencing task prioritization. For instance, NLP can be used to analyze task descriptions and extract keywords that indicate instructions, deadlines, assignees, and so forth. To extract actions using observed properties of task board information items in the project management platform, the process assessment platform 104 observes properties such as action status (e.g., "To Do," "In Progress," "Completed"), priority levels, assigned team members, due dates, and/or any comments or notes associated with each action. The process assessment platform 104 uses these observed properties to gather contextual information about the current state of the project. Once the first AI model processes the input data, the first AI model outputs a set of actions, a set of dependencies within the set of actions, and/or a set of priorities of the set of actions. For example, the first AI model can identify that "Task A" should be completed before "Task B" due to resource constraints or project deadlines.

In some implementations, the process assessment platform 104 can organize the obtained set of input data into a predefined schema that aligns with an expected input format of the first AI model. The obtained set of input data can be converted into numerical vectors to represent words in a continuous vector space. For example, the process assessment platform 104 converts words or phrases into numerical vectors that can be processed by subsequent AI models. The text can be tokenized by splitting the text into individual words or tokens. For example, the process assessment platform 104 uses TF-IDF (Term Frequency-Inverse Document Frequency) to vectorize the tokenized text, which calculates the importance of a word in a document relative to a collection of documents. TF-IDF assigns a higher weight to words that are frequent in a specific document but rare across the entire dataset, thus capturing the significance of terms. Another method of vectorization is word embeddings, such as Word2Vec or GloVe (Global Vectors for Word Representation), which map words into a continuous vector space where semantically similar words are positioned closer together. Word2Vec, for example, uses neural networks to learn word associations from a large corpus of text, producing dense vectors that capture contextual relationships. Once the input data is vectorized, the input data is fed into the first AI model, which can be trained on historical project data, where each vectorized input is associated with specific actions and outcomes. During training, the first AI model learns to recognize patterns and relationships within the vectorized data that correlate with particular actions. The vectorized input data is processed by the first AI model to predict a set of actions. For instance, if the vectorized data indicates a high frequency of terms related to "resource constraints," the first AI model can identify actions such as "allocate additional resources." The first AI model can output the actions along with the corresponding priority levels and dependencies.

In operation 406, using the identified set of actions, the process assessment platform 104 dynamically classifies, using a second AI model, each particular dimension of the set of task board information items of the workflow into a degree of completion. The second AI model can be a different type of AI model from the first AI model or another instance of an Large Language Model (LLM), and is trained to understand and classify these dimensions based on the input data received.

For each particular dimension of the set of task board information items, the process assessment platform 104 can dynamically generate a set of queries configured to operate as an input into the second AI model. A query is a structured request for information that the AI model can process to make a classification. The set of queries can include, for example, the set of observed task board information item properties of the particular dimension, a set of expected task board information item properties of the particular dimension, and/or a set of pre-loaded query context defining one or more task board information items of the set of task board information items. The set of pre-loaded query context can include a set of definitions defining each degree of completion. The pre-loaded query context provides additional background information that helps the AI model make more accurate classifications. The context can include a set of definitions defining each degree of completion, such as "not started," "in progress," "nearly complete," and "complete."

Using the set of queries, the process assessment platform 104 can map, via the second AI model, the particular dimension of the workflow to the degree of completion. The particular dimension could be any aspect of the workflow, such as "data management," "model development," or "model refinement," and the degree of completion indicates how much progress has been made in that area. The second AI model can, responsive to receiving the generated set of queries, compare the set of observed task board information item properties of the particular dimension with the set of expected task board information item properties of the particular dimension. The observed properties are the actual data points collected from the task board, such as task descriptions, deadlines, and assignees, while the expected properties are the attributes that the tasks have at a particular degree of completion. By comparing the two sets of properties, the AI model can assess how closely the current state of the tasks aligns with the expected state, which helps in determining the degree of completion. The degree of completion can indicate a quantity of executed actions of the set of actions of the workflow for the particular dimension. For example, if the dimension is "model development," the degree of completion can reflect how many development tasks have been completed, how many are in progress, and how many are yet to be started.

In some implementations, the first and/or second AI model is a large language model (LLM) trained on historical workflow data to classify each particular dimension (e.g., dimensions 312 in FIG. 3) of the set of task board information items of the workflow into a corresponding degree of completion. An LLM can be based on architectures like GPT (Generative Pre-trained Transformer), which is capable of understanding and generating human-like text by learning from large amounts of textual data. The historical workflow data can include a set of labeled task board information items and corresponding expected task board information item properties. The dimensions can be specific aspects of the workflow, such as "data management," "model development," and "model refinement." In some implementations, the dimensions can change based on the workflow type. For instance, in a software development workflow, dimensions can include "code review," "testing," and "deployment." The labeled items serve as training data, allowing the LLM to learn the relationships and patterns between different dimensional attributes and their degrees of completion. Further examples of the first and second AI model are discussed with reference to AI system 500 in FIG. 5. Once trained, the first and/or second AI model can analyze new task board information items and classify each dimension into a corresponding degree of completion.

In operation 408, the process assessment platform 104 can generate for display at the GUI of the computing engine, a graphical layout indicating the degrees of completion. The graphical layout can include a first graphical representation of each particular dimension of the set of task board information items and a second graphical representation of a corresponding degree of completion for each particular dimension of the set of task board information items. The first graphical representation can be a list or a grid that shows different dimensions such as "data management," "model development," and "model refinement." The second graphical representation shows the degree of completion for each dimension. This could be displayed using progress bars, pie charts, or other visual indicators that clearly show how much of each task has been completed. For example, a progress bar can be filled to 75% to indicate that the "model development" dimension is 75% complete.

In some implementations, the first graphical representation can include unique visual indicators for particular degrees of completion of the sets of actions within each particular dimension. The visual indicators could be color-coded icons, symbols, or labels that provide additional context. For instance, a green checkmark can indicate that a task is complete, a yellow triangle can indicate that a task is in progress, and/or a red cross can indicate that a task has not been started.

In some implementations, the set of actions is a first set of actions. The process assessment platform 104 can, using the degrees of completion, cause a third AI model to generate a second set of actions indicating expected task board information item properties in the set of expected task board information item properties absent from the set of observed task board information item properties. The third AI model can be the same as or different from the first AI model and/or the second AI model. For example, the third AI model identifies gaps or missing elements in the current state of the workflow and generates actions (e.g., the second set of actions) to address the gaps. For example, if the degree of completion for the "model development" dimension is low because certain code reviews have not been completed, the second set of actions can include tasks such as "assign code reviews to team members" or "schedule code review meetings." The process assessment platform 104 can generate for display at the GUI of the computing engine a third graphical representation of the graphical layout indicating the second set of actions. For example, an indicator can show the current degree of completion (e.g., maturity level 324 or score in FIG. 3C) for a dimension adjacent to a list of the second set of actions (e.g., recommendations 328 in FIG. 3C) corresponding to the degree of completion.

To generate the second set of actions, the process assessment platform 104 can construct a set of queries (e.g., prompt) configured to operate as input in the third AI model that include information about the current state of the workflow, the degrees of completion obtained from the second AI model, and/or the expected properties of the tasks. For example, a query can be: "Given that the 'model development' dimension is 50% complete and the following tasks are pending, what actions should be taken to achieve full completion?" The process assessment platform 104 can iteratively refine the queries based on the model's outputs and feedback from users. Techniques such as few-shot learning, where the model is provided with a few examples of the desired output, can be used to improve the model's performance. Actions to resolve the gaps can include, for example, reassigning tasks, adjusting deadlines, or allocating additional resources.

In some implementations, the third AI model is a decision tree, which makes classifications based on a series of if-then rules derived from the training data. A decision tree is a flowchart-like structure where each internal node represents a test on an attribute (e.g., "Is the task overdue?"), each branch represents the outcome of the test (e.g., "Yes" or "No"), and each leaf node represents a class label (e.g., "High Priority" or "Low Priority"). The paths from the root to the leaf represent classification rules. During training, the decision tree algorithm selects the attribute that best splits the data into distinct classes based on a criterion such as Gini impurity or information gain. This process is repeated recursively to build the tree. For example, in a project management context, the decision tree can first split tasks based on their deadlines, then further split based on the assignee's workload, and finally classify tasks into categories like "Urgent," "Normal," or "Low Priority." This hierarchical structure allows the decision tree to make easily interpretable classifications.

In some implementations, the third model uses a support vector machine (SVM) to separate data points into different categories based on the categories' features. SVM is a supervised learning algorithm that finds the optimal hyperplane that maximizes the margin between different classes in a high-dimensional space. The hyperplane is a decision boundary that separates the data points of different classes. SVM transforms the original data into a higher-dimensional space using a kernel function (e.g., linear, polynomial, radial basis function) and identifies the hyperplane that best separates the classes. For example, in a workflow management scenario, SVM can be used to classify tasks based on features such as task duration, complexity, and resource allocation. The third AI model can identify the boundary that separates tasks into categories like "Completed," "In Progress," and "Not Started."

In some implementations, the third AI model is an amalgamation of models operating under a singular framework, such as ensemble methods like random forests or gradient boosting. Ensemble methods combine multiple models to improve overall classification accuracy and robustness. A random forest, for example, is an ensemble of decision trees where each tree is trained on a random subset of the data and features. The final classification is made by aggregating the predictions of all the trees, typically through majority voting. The approach reduces the risk of overfitting and improves generalization. Gradient boosting, on the other hand, builds an ensemble of weak learners (typically decision trees) sequentially, where each new tree corrects the errors made by the previous trees. The model is trained to minimize a loss function, and the final prediction is a weighted sum of the predictions of all the trees. For instance, in a project management context, a gradient boosting model can iteratively improve the predictions of task completion status and/or degree of completion by focusing on tasks that were misclassified in previous iterations.

In some implementations, using the generated second set of actions, the process assessment platform 104 can automatically execute the second set of actions (e.g., computer executables that relate to the task board information items). For instance, the process assessment platform 104 can integrate with project management tools like through the tools' APIs. Once the second set of actions is generated, the process assessment platform 104 can use the APIs to create, update, or reassign tasks automatically. For example, if the second set of actions includes "assign code reviews to team members," the process assessment platform 104 can make an API call to the project management system to create new code review tasks and assign the tasks to particular team members based on their availability and expertise.

In some implementations, the process assessment platform 104 can integrate with code repositories and can cause code units to be automatically saved, versioned up, distributed, committed, and so forth. For example, if the second set of actions includes tasks such as "merge feature branch into main branch" or "create a pull request," the process assessment platform 104 can use the repository's API to perform these actions. For example, the process assessment platform 104 can automatically create a pull request for a feature branch that is ready for review, notify the relevant team members, and/or merge the branch into the main branch once the review is complete. Moreover, the process assessment platform 104 can trigger actions in CI/CD tools. For example, if the second set of actions includes "run unit tests" or "deploy to staging environment," the process assessment platform 104 can trigger the corresponding CI/CD pipeline (e.g., making an API call to the CI/CD tool to start a build job that runs unit tests and deploys the application to a staging environment). For example, in a ML-based workflow where the process assessment platform 104 identifies that the "model development" dimension is only 50% complete and generates a second set of actions including "refine the data preprocessing pipeline" and/or "increase the frequency of model evaluation," the process assessment platform 104 can automatically execute the actions by making API calls to the project management tool to create tasks for refining the data preprocessing pipeline and triggering the CI/CD pipeline to schedule more frequent model evaluations.

In some implementations, the process assessment platform 104 can cause alerts to be automatically generated and delivered to the appropriate computing systems via text messages, pop-up messages, email messages, and so forth. For example, the the process assessment platform 104 can be configured to interface/communicate with various communication channels, integrating with APIs provided by short message service (SMS) gateways, email servers, and/or push notification services. The process assessment platform 104 can define conditions or triggers that generate the alerts, such as task deadlines approaching, task status changes, and/or the completion of particular project milestones. The process assessment platform 104 continuously monitors these conditions in real-time, using event listeners or scheduled checks to detect when an alert needs to be generated. Once a triggering event is detected, the process assessment platform 104 constructs the alert message, which can include project or task related information such as task details, the nature of the alert, and/or any required actions. The process assessment platform 104 can format the alert based on the chosen communication channel. The process assessment platform 104 can use the integrated APIs to send the alert to the appropriate recipients (e.g., making API calls to the SMS gateway for text messages, connecting to the email server via Simple Mail Transfer Protocol (SMTP) or a dedicated email API for email notifications, or using the push notification service's API for push notifications).

In some implementations, the process assessment platform 104 can automatically execute actions such as retraining the model with updated data, deploying the updated model to a testing environment, and/or generating performance reports (e.g., prediction accuracy, precision, recall, and/or F1 scores). For example, retraining the model can be triggered by the availability of new data, a scheduled time interval, and/or a drop in model performance metrics. The process assessment platform 104 continuously monitors the conditions using event listeners or scheduled jobs. When a trigger is detected, the process assessment platform 104 can initiate the retraining process by loading the updated data into the ML model. The process assessment platform 104 can use the ML framework's API to execute the training process to adjust parameters and/or hyperparameters of the model.

The process assessment platform 104 can determine, using a third AI model, whether an action of the workflow has been performed by retrieving code from a code repository associated with the workflow. The process assessment platform 104 can detect a presence of code changes, code commits, and/or indicators of task completion. The process assessment platform 104 can compare the detected presence with a set of expected code modifications defined in the set of expected task board information item properties. For example, using code retrieved (e.g., via an API of the code repository), the process assessment platform 104 extracts features indicating task completion, such as commit messages, timestamps, author information, and the files changed in each commit. For instance, a commit message like "Completed data preprocessing pipeline" or "Merged feature branch into main" can be strong indicators of task completion.

In some implementations, the process assessment platform 104 identifies keywords or phrases that signify task completion. The process assessment platform 104 maintains a set of expected code modifications defined in the set of expected task board information item properties, based on the workflow's requirements and the tasks that need to be completed. For example, if the workflow includes a task to implement a new feature, the expected modifications can include changes to specific files, the addition of new functions, or updates to documentation. The process assessment platform 104 compares the detected code changes and commits with these expected modifications to determine if the actions have been performed. The determination can be performed by one or more AI models. For example, the one or more AI models can be a supervised learning model trained on historical data, where the input features include commit details, code changes, and task descriptions, and the output labels indicate whether the task is complete. The one or more AI models learn patterns and relationships between code changes and task completion. For instance, the one or more AI models can classify a task as "complete" if the detected code changes or identified keywords match the expected modifications with a high degree of confidence.

In some implementations, the process assessment platform 104 can automatically generate a set of alerts and/or recommendations based on the degrees of completion. The alerts and/or recommendations can indicate a delay in the completion of the sets of actions within the particular dimension. For example, the alerts are triggered when a particular degree of completion falls below a predefined threshold. The recommendations (e.g., recommendations 328 in FIG. 3C) can include a set of actions configured to increase the quantity of executed actions of the set of actions of the workflow for the particular dimension (i.e., increase the degree of completion for the particular dimension). The predefined thresholds can be set based on project requirements, deadlines, and/or other customizable features of the project. For instance, a threshold can be set at 50% for the "data preprocessing" dimension, meaning that if the degree of completion falls below 50%, an alert will be triggered.

The process assessment platform 104 can, in some implementations, update the degrees of completion based on updated input data from project management tools, code repositories, and other sources. For example, if a new commit is made to the code repository, the process assessment platform 104 updates the degree of completion for the relevant dimension. When the degree of completion for a particular dimension falls below the predefined threshold, the process assessment platform 104 automatically generates an alert. The alert can include information about the dimension, the current degree of completion, the threshold, and/or the specific actions that are delayed. For example, if the degree of completion for "model evaluation" falls to 40% (below the threshold of 50%), the alert can include information about the specific evaluation tasks that are pending and the potential impact on the project timeline. The process assessment platform 104 can use various notification mechanisms to deliver the alerts. For example, the process assessment platform 104 can send an email to the project manager with the alert details.

Example Embodiment of the Model of the Process Assessment Platform

Figure 5:
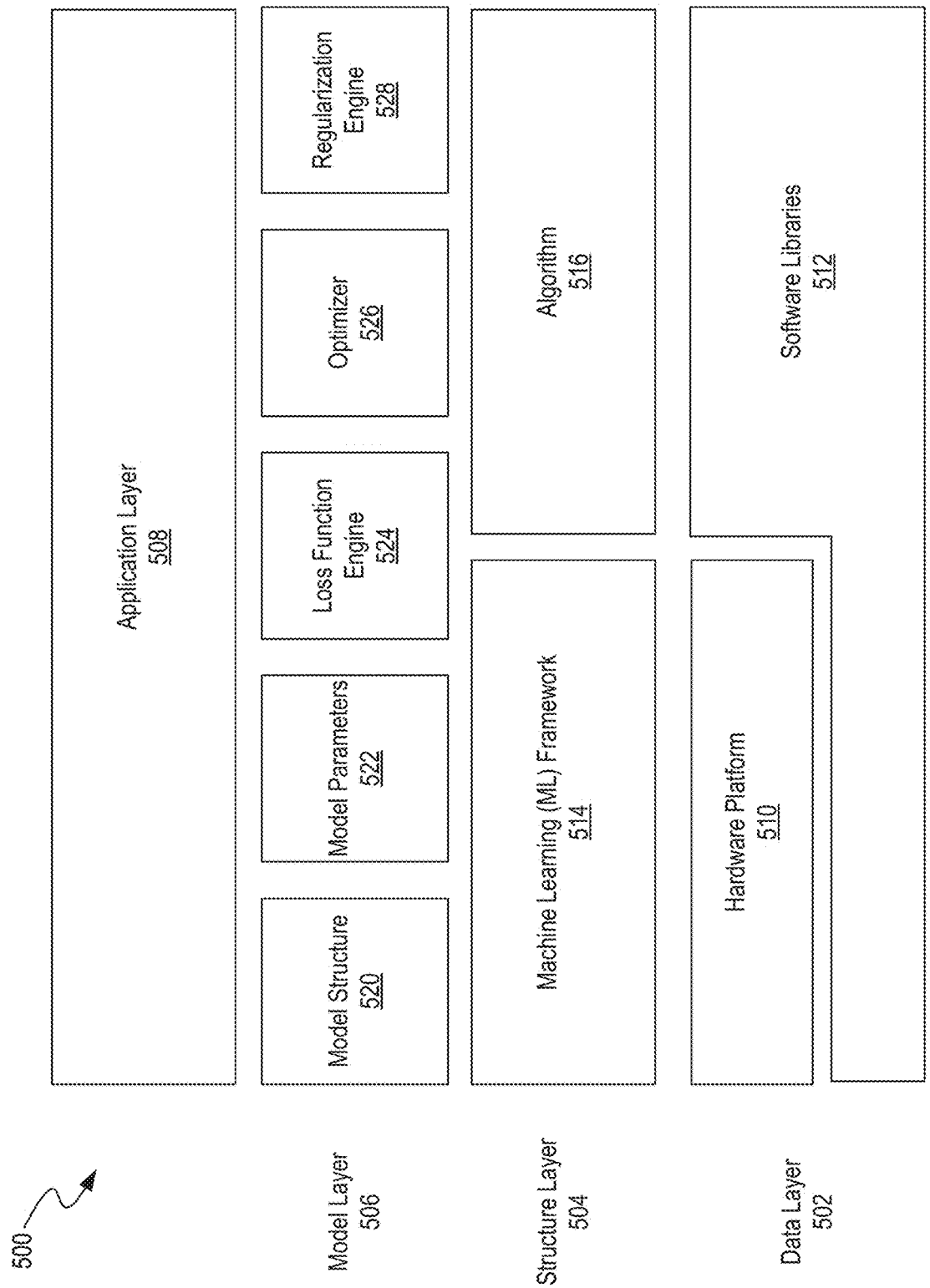
FIG. 5 illustrates a layered architecture of an artificial intelligence (AI) system that can implement the machine learning models of the process assessment platform of FIG. 1, in accordance with some implementations of the present technology.

FIG. 5 illustrates a layered architecture of an artificial intelligence (AI) system 500 that can implement the ML models of the process assessment platform 104 of FIG. 1, in accordance with some implementations of the present technology. Example ML models can include the models executed by the model 112. Accordingly, the model 112 can include one or more components of the AI system 500.

As shown, the AI system 500 can include a set of layers, which conceptually organize elements within an example network topology for the AI system's architecture to implement a particular AI model. Generally, an AI model is a computer-executable program implemented by the AI system 500 that analyses data to make predictions. Information can pass through each layer of the AI system 500 to generate outputs for the AI model. The layers can include a data layer 502, a structure layer 504, a model layer 506, and an application layer 508. The algorithm 516 of the structure layer 504 and the model structure 520 and model parameters 522 of the model layer 506 together form an example AI model. The optimizer 526, loss function engine 524, and regularization engine 528 work to refine and optimize the AI model, and the data layer 502 provides resources and support for application of the AI model by the application layer 508.

The data layer 502 acts as the foundation of the AI system 500 by preparing data for the AI model. As shown, the data layer 502 can include two sub-layers: a hardware platform 510 and one or more software libraries 512. The hardware platform 510 can be designed to perform operations for the AI model and include computing resources for storage, memory, logic and networking, such as the resources described in relation to FIGS. 6 and 7. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider. The hardware platform 510 can also include computer memory for storing data about the AI model, application of the AI model, and training data for the AI model. The computer memory can be a form of random-access memory (RAM), such as dynamic RAM, static RAM, and non-volatile RAM.

The software libraries 512 can be thought of suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that allows users to build and deploy the AI model. The ML framework 514 can include an open-source library, an application programming interface (API), a gradient-boosting library, an ensemble method, and/or a deep learning toolkit that work with the layers of the AI system facilitate development of the AI model. For example, the ML framework 514 can distribute processes for application or training of the AI model across multiple resources in the hardware platform 510. The ML framework 514 can also include a set of pre-built components that have the functionality to implement and train the AI model and allow users to use pre-built functions and classes to construct and train the AI model. Thus, the ML framework 514 can be used to facilitate data engineering, development, hyperparameter tuning, testing, and training for the AI model. Examples of ML frameworks 514 that can be used in the AI system 500 include TENSORFLOW, PYTORCH, SCIKIT-LEARN, KERAS, LightGBM, RANDOM FOREST, and AMAZON WEB SERVICES.

The algorithm 516 can be an organized set of computer-executable operations used to generate output data from a set of input data and can be described using pseudocode. The algorithm 516 can include complex code that allows the computing resources to learn from new input data and create new/modified outputs based on what was learned. In some implementations, the algorithm 516 can build the AI model through being trained while running computing resources of the hardware platform 510. This training allows the algorithm 516 to make predictions or decisions without being explicitly programmed to do so. Once trained, the algorithm 516 can run at the computing resources as part of the AI model to make predictions or decisions, improve computing resource performance, or perform tasks. The algorithm 516 can be trained using supervised learning, unsupervised learning, semi-supervised learning, and/or reinforcement learning.

Using supervised learning, the algorithm 516 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of document images from user 102) from various source computing systems described in relation to FIG. 1. Furthermore, training data can include pre-processed data generated by various engines of the process assessment platform 104 described in relation to FIG. 1. The user may label the training data based on one or more classes and trains the AI model by inputting the training data to the algorithm 516. The algorithm determines how to label the new data based on the labeled training data. The user can facilitate collection, labeling, and/or input via the ML framework 514. In some instances, the user may convert the training data to a set of feature vectors for input to the algorithm 516. Once trained, the user can test the algorithm 516 on new data to determine if the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can involve classification and/or regression. Classification techniques involve teaching the algorithm 516 to identify a category of new observations based on training data and are used when input data for the algorithm 516 is discrete. Said differently, when learning through classification techniques, the algorithm 516 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based preprocessing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format. The process assessment platform 104 can use unsupervised learning to identify patterns in claim history (e.g., to identify particular event sequences) and so forth. In some implementations, performance of the model 112 that can use unsupervised learning is improved because the incoming data from the project management platform 108 and/or the code repository 110 is pre-processed and reduced, based on the relevant triggers, as described herein.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 516 include factor analysis, item response theory, latent profile analysis, and latent class analysis.

The model layer 506 implements the AI model using data from the data layer and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model of the AI system 500. The model structure 520 defines the complexity of the pattern/relationship that the AI model expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model and the actual output of the AI model and is used to guide optimization of the AI model during training to minimize the loss function. The loss function may be presented via the ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constrain the resulting AI model and improves its ability for generalized application. Examples of regularization techniques include lasso (L1) regularization, ridge (L2) regularization, and elastic (L1 and L2 regularization).

The application layer 508 describes how the AI system 500 is used to solve problem or perform tasks. In an example implementation, the application layer 508 can include the assessment user interface 106 of the process assessment platform 104.

Example Computing Environment of the Process Assessment Platform

Figure 6:
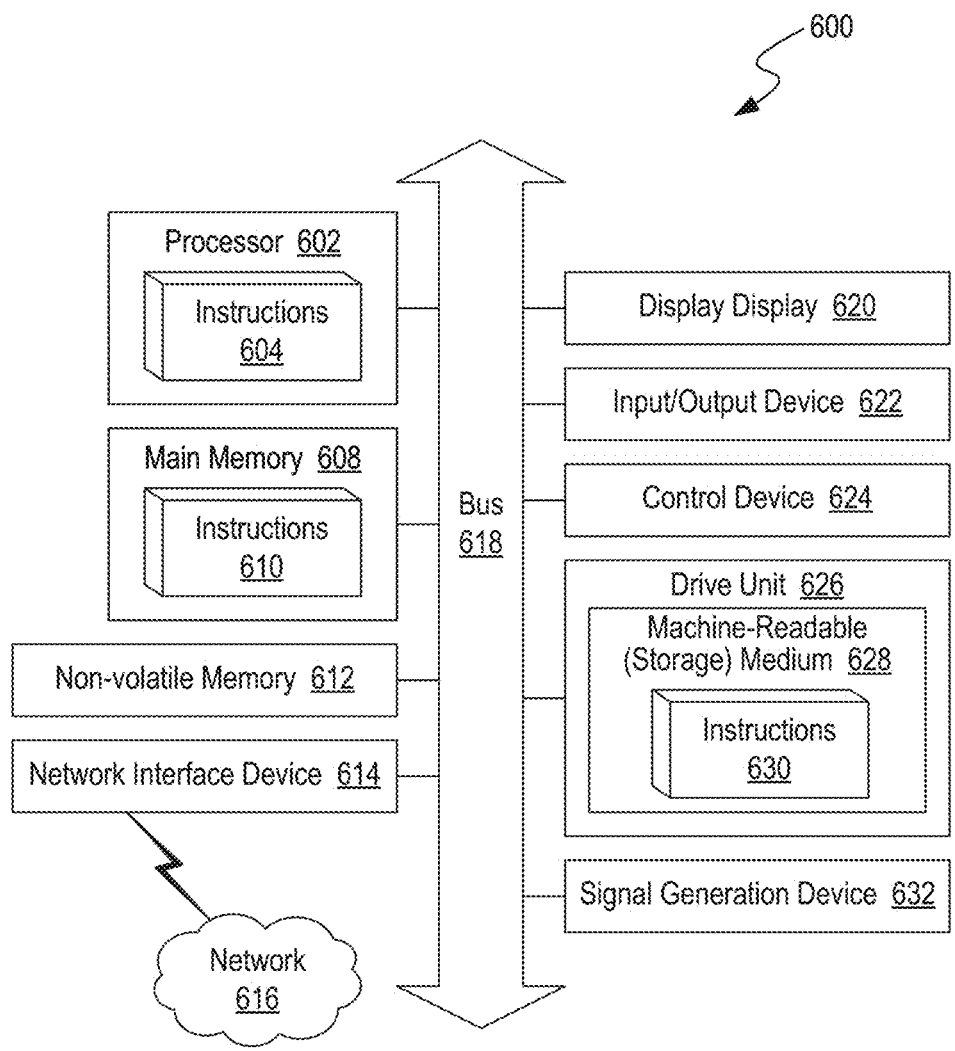
FIG. 6 is a block diagram showing some of the components typically incorporated in at least some of the computer systems and other devices on which the process assessment platform operates in accordance with some implementations of the present technology.

FIG. 6 is a block diagram showing some of the components typically incorporated in at least some of the computer systems and other devices 600 on which the disclosed system operates in accordance with some implementations of the present technology. As shown, an example computer system 600 can include: one or more processors 602, main memory 608, non-volatile memory 612, a network interface device 614, video display device 620, an input/output device 622, a control device 624 (e.g., keyboard and pointing device), a drive unit 626 that includes a machine-readable medium 628, and a signal generation device 632 that are communicatively connected to a bus 618. The bus 618 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 614 enables the computer system 600 to exchange data in a network 616 with an entity that is external to the computing system 600 through any communication protocol supported by the computer system 600 and the external entity. Examples of the network interface device 614 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 608, non-volatile memory 612, machine-readable medium 628) can be local, remote, or distributed. Although shown as a single medium, the machine-readable medium 628 can include multiple media (e.g., a centralized/distributed database and/or associated caches and servers) that store one or more sets of instructions 630. The machine-readable (storage) medium 628 can include any medium that is capable of storing, encoding, or carrying a set of instructions for execution by the computer system 600. The machine-readable medium 628 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 610, 630) set at various times in various memory and storage devices in computing device(s). When read and executed by the processor 602, the instruction(s) cause the computer system 600 to perform operations to execute elements involving the various aspects of the disclosure.

Figure 7:
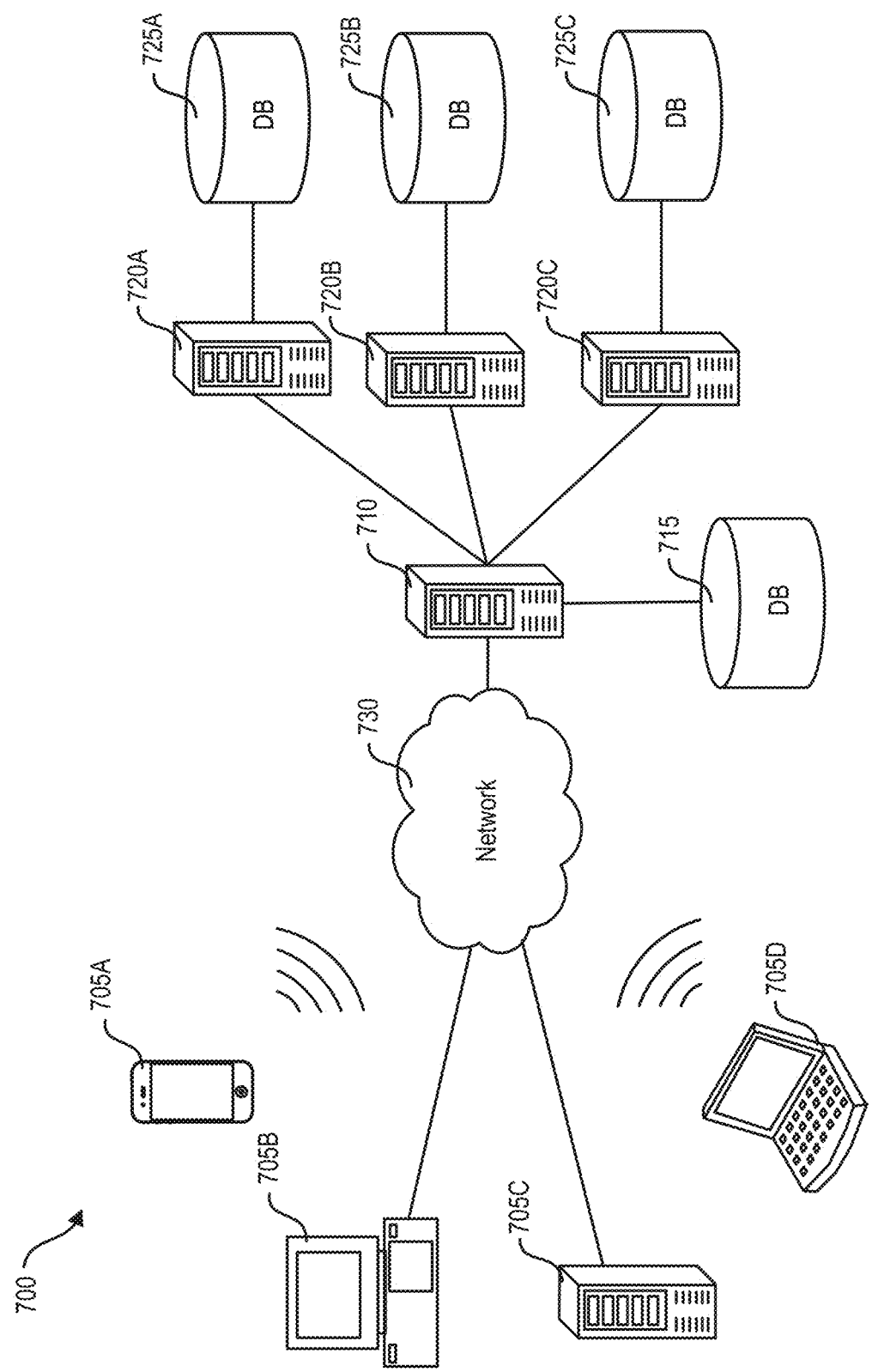
FIG. 7 is a system diagram illustrating an example of a computing environment in which the process assessment platform operates in some implementations of the present technology.

FIG. 7 is a system diagram illustrating an example of a computing environment in which the disclosed system operates in some implementations. In some implementations, environment 700 includes one or more client computing devices 705A-D, examples of which can host the process assessment platform 104 of FIG. 1. Client computing devices 705 operate in a networked environment using logical connections through network 730 to one or more remote computers, such as a server computing device.

In some implementations, server 710 is an edge server which receives client requests and coordinates fulfillment of those requests through other servers, such as servers 720A-C. In some implementations, server computing devices 710 and 720 comprise computing systems, such as the process assessment platform 104 of FIG. 1. Though each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server or client devices. In some implementations, servers (710, 720A-C) connect to a corresponding database (715, 725A-C). As discussed above, each server 720 can correspond to a group of servers, and each of these servers can share a database or can have its own database. Databases 715 and 725 warehouse (e.g., store) information such as claims data, email data, call transcripts, call logs, policy data and so on. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. In some implementations, network 730 is the Internet or some other public or private network. Client computing devices 705 are connected to network 730 through a network interface, such as by wired or wireless communication. While the connections between server 710 and servers 720 are shown as separate connections, these connections can be any kind of local, wide area, wired, or wireless network, including network 730 or a separate public or private network.

Example Use Cases of the Process Assessment Platform

Various use cases for the process assessment platform, such as process assessments relating to project management and workflow completion, are described above. For example, the process assessment platform can be used to optimize the workflow of a software development project. The process assessment platform can integrate with various project management tools and/or code repositories to dynamically identify and classify tasks and determine the degrees of completion for particular dimensions of the workflow. Further, the process assessment platform can automatically generate and/or execute actions based on the degrees of completion. Additionally, the process assessment platform can evaluate code in the code repository directly to determine if a task is complete. The process assessment platform can verify whether specific coding tasks, such as implementing a feature or fixing a bug, have been completed according to the requirements. For instance, the process assessment platform can check for the presence of specific functions, classes, or code patterns that indicate the completion of a task. If the process assessment platform determines that the code does not meet the required criteria, the process assessment platform can trigger actions such as requesting additional work from the development team or providing feedback on the necessary changes.

As another example, the process assessment platform can be used in the context of supply chain management to ensure the timely and accurate execution of procurement, inventory management, and logistics tasks. The process assessment can obtain data from various sources (e.g., ERP systems, warehouse management systems) and dynamically generate actions to address issues such as stock shortages, delayed shipments, or quality control problems. For instance, if the process assessment detects that inventory levels for a component are running low, the process assessment can automatically trigger a purchase order to replenish the stock. Additionally, the process assessment can classify supply chain tasks into different stages (e.g., procurement, production, distribution) and track their progress in real-time. The classification allows supply chain managers to monitor the status of each stage and identify potential bottlenecks. If the process assessment detects a delay in the production stage, the process assessment can automatically reallocate resources or adjust task priorities to ensure timely completion.

As yet another example, the process assessment platform can be used to generate maintenance triggers for systems or equipment. The process assessment platform can classify the maintenance tasks into degrees of completion. For example, the platform can categorize tasks into stages such as "inspection scheduled," "parts ordered," "maintenance in progress," and "maintenance completed." If the platform detects that a task is not progressing as expected (e.g., parts have been ordered but not yet received), it can trigger additional actions to address the delay, such as expediting the order or reallocating resources to other tasks. In an example maintenance use case, the process assessment platform can analyze data from IoT sensors and maintenance logs to identify equipment that requires maintenance or is at risk of failure. The criteria for generating maintenance triggers can include equipment usage patterns, performance metrics, and historical maintenance data. For instance, if the process assessment platform detects that a machine has been operating continuously for an extended period and is showing signs of wear, the process assessment platform can trigger a maintenance action to inspect and service the machine. The triggers can be configured to respond to specific events (e.g., equipment reaching a certain usage threshold) and can initiate actions such as scheduling maintenance, ordering replacement parts, or notifying maintenance personnel.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:

1. A computer-implemented method for automatic query calibration in sequenced models used to generate system actions in managing process deployments, the method comprising:
 obtaining, by a graphical user interface (GUI) of a computing engine, a set of input data from one or more process management systems defining a workflow,
  wherein the set of input data includes a set of observed task board information item properties of a set of task board information items associated with the workflow;
 using the obtained set of input data, dynamically identifying, using a first trained artificial intelligence (AI) model, a set of actions from the workflow to be executed;
 using the identified set of actions, dynamically classifying, using a second trained AI model, a particular dimension of the set of task board information items of the workflow into a degree of completion by, for the particular dimension of the set of task board information items:
  dynamically generating a set of queries configured to operate as an input into the second AI model,
   wherein the set of queries comprises two or more of: (1) the set of observed task board information item properties of the particular dimension, (2) a set of expected task board information item properties of the particular dimension, or (3) a set of pre-loaded query contexts defining one or more task board information items of the set of task board information items, and
  using the set of queries, mapping, via the second AI model, the particular dimension of the workflow to the degree of completion,
   wherein the second AI model is configured to, responsive to receiving the generated set of queries, compare the set of observed task board information item properties of the particular dimension with the set of expected task board information item properties of the particular dimension, and
   wherein the degree of completion is configured to indicate a quantity of executed actions of the set of actions of the workflow for the particular dimension; and
 generating for display at the GUI of the computing engine, a graphical layout indicating the degrees of completion, wherein the graphical layout includes a first graphical representation of the particular dimension of the set of task board information items and a second graphical representation of a corresponding degree of completion for the particular dimension of the set of task board information items.

2. The computer-implemented method of claim 1, wherein the set of actions is a first set of actions, the computer-implemented method further comprising:
 using the degrees of completion, causing a third trained AI model to generate a second set of actions indicating expected task board information item properties in the set of expected task board information item properties absent from the set of observed task board information item properties, and
 generating for display at the GUI of the computing engine, a third graphical representation of the graphical layout indicating the second set of actions.

3. The computer-implemented method of claim 2, further comprising:
 using the generated second set of actions, automatically executing the second set of actions.

4. The computer-implemented method of claim 1,
 wherein the observed task board information item properties include at least one of:
  a task attribute set, a project attribute set, or a code attribute set,
 wherein the task attribute set comprises at least one of: task descriptions, deadlines, or assignee,
 wherein the project attribute set comprises at least one of: project milestones, timelines, or resource allocations, and
 wherein the code attribute set comprises at least one of: code quality metrics, repository status, or version control information.

5. The computer-implemented method of claim 1,
 wherein the first AI model is a large language model (LLM) trained on historical workflow data to classify the particular dimension of the set of task board information items of the workflow into a corresponding degree of completion, and
 wherein the historical workflow data includes a set of labeled task board information items and corresponding expected task board information item properties.

6. The computer-implemented method of claim 1, further comprising:
 generating a set of recommendations based on the degrees of completion,
  wherein the recommendations indicate a delay in the completion of the sets of actions within the particular dimension, and
  wherein the recommendations include a set of actions configured to increase the quantity of executed actions of the set of actions of the workflow for the particular dimension.

7. The computer-implemented method of claim 1, wherein the first graphical representation includes unique visual indicators for particular degrees of completion of the sets of actions within the particular dimension.

8. One or more non-transitory, computer-readable storage media storing instructions for managing process deployments, wherein the instructions when executed by at least one data processor of a computing system, cause the computing system to:
obtain, by a computing engine, a set of input data from one or more process management systems defining a workflow,
wherein the set of input data includes a set of observed task board information item properties of a set of task board information items associated with the workflow;
using the obtained set of input data, dynamically identify, using a first artificial intelligence (AI) model, a set of actions from the workflow to be performed; and
using the identified set of actions, dynamically classify, using a second AI model, a particular dimension of the set of task board information items of the workflow into a degree of completion by, for the particular dimension of the set of task board information items:
dynamically generating a set of queries configured to operate as an input into the second AI model,
wherein the set of queries comprises two or more of: (1) the set of observed task board information item properties of the particular dimension, (2) a set of expected task board information item properties of the particular dimension, or (3) a set of pre-loaded query context defining one or more task board information items of the set of task board information items, and
using the set of queries, mapping, via the second AI model, the particular dimension of the workflow to the degree of completion,
wherein the second AI model is configured to, responsive to receiving the generated set of queries, compare the set of observed task board information item properties of the particular dimension with the set of expected task board information item properties of the particular dimension, and
wherein the degree of completion is configured to indicate a quantity of performed actions of the set of actions of the workflow for the particular dimension.

9. The one or more non-transitory, computer-readable storage media of claim 8, wherein the set of actions is a first set of actions, wherein the instructions further cause the computing system to:
using the degrees of completion, causing a third AI model to generate a second set of actions indicating expected task board information item properties in the set of expected task board information item properties absent from the set of observed task board information item properties, and
generate for display at a graphical user interface (GUI) of the computing engine, a graphical representation indicating the second set of actions.

10. The one or more non-transitory, computer-readable storage media of claim 9, wherein the instructions further cause the system to:
using the generated second set of actions, automatically execute the second set of actions.

11. The one or more non-transitory, computer-readable storage media of claim 8, wherein the instructions further cause the computing system to:
determine, using a third AI model, whether an action of the workflow has been performed by:
retrieving code from a code repository associated with the workflow, detecting a presence of one or more of: code changes, code commits, or indicators of task completion, and
comparing the detected presence with a set of expected code modifications defined in the set of expected task board information item properties.

12. The one or more non-transitory, computer-readable storage media of claim 8, wherein the set of pre-loaded query context includes a set of definitions defining each degree of completion.

13. The one or more non-transitory, computer-readable storage media of claim 8, wherein the set of input data is obtained from scraping one or more of: the one or more process management systems or code repositories.

14. The one or more of non-transitory, computer-readable storage media of claim 13, wherein the instructions further cause the computing system to:
organize the obtained set of input data into a predefined schema that aligns with an expected input format of the first AI model.

15. A system comprising:
at least one hardware processor; and
at least one non-transitory memory storing instructions, which, when executed by the at least one hardware processor, cause the system to:
obtain a set of input data from one or more process management systems defining a workflow,
wherein the set of input data includes a set of observed task board information item properties of a set of task board information items associated with the workflow;
using the obtained set of input data, dynamically identify, using a first model, a set of actions from the workflow to be performed; and
using the identified set of actions, dynamically classify, using a second model, a particular dimension of the set of task board information items of the workflow into a degree of completion,
wherein the second model is configured to, responsive to receiving a set of queries, generate a set of mappings of the particular dimension of the workflow to the degree of completion,
wherein the set of queries comprises two or more of: (1) the set of observed task board information item properties of the particular dimension, (2) a set of expected task board information item properties of the particular dimension, or (3) a set of pre-loaded query context defining one or more task board information items of the set of task board information items, and
wherein the degree of completion is configured to indicate a quantity of performed actions of the set of actions of the workflow for the particular dimension.

16. The system of claim 15, wherein the set of actions is a first set of actions, wherein the system is further caused to:
using the degrees of completion causing a third AI model to generate a second set of actions indicating expected task board information item properties in the set of expected task board information item properties absent from the set of observed task board information item properties, and generate for display at a graphical user interface (GUI), a graphical representation indicating the second set of actions.

17. The system of claim 16, wherein the system is further caused to:
using the generated second set of actions, automatically execute the second set of actions.

18. The system of claim 15, wherein the system is further caused to:
determine, using a third AI model, whether an action of the workflow has been performed by:
retrieving code from a code repository associated with the workflow, detecting a presence of one or more of: code changes, code commits, or indicators of task completion, and
comparing the detected presence with a set of expected code modifications defined in the set of expected task board information item properties.

19. The system of claim 15,
wherein the observed task board information item properties include at least one of:
a task attribute set, a project attribute set, or a code attribute set,
wherein the task attribute set comprises at least one of: task descriptions, deadlines, or assignee,
wherein the project attribute set comprises at least one of: project milestones, timelines, or resource allocations, and
wherein the code attribute set comprises at least one of: code quality metrics, repository status, or version control information.

20. The system of claim 15, wherein the system is further caused to:
generate a set of recommendations based on the degrees of completion,
wherein the recommendations indicate a delay in the completion of the sets of actions within the particular dimension, and
wherein the recommendations include a set of actions configured to increase the quantity of executed actions of the set of actions of the workflow for the particular dimension.

* * * * *